(No Model.)

J. L. BENTON.
BICYCLE SUPPORTING STAND.

No. 573,811. Patented Dec. 22, 1896.

Witnesses:—
George Barry Jr.
P. B. Seward.

Inventor:
John L. Benton.
by attorneys
Brown & Seward

UNITED STATES PATENT OFFICE.

JOHN L. BENTON, OF NEW HAVEN, CONNECTICUT, ASSIGNOR OF ONE-HALF TO CHARLES R. BISHOP, OF SAME PLACE.

BICYCLE-SUPPORTING STAND.

SPECIFICATION forming part of Letters Patent No. 573,811, dated December 22, 1896.

Application filed June 11, 1896. Serial No. 595,091. (No model.)

*To all whom it may concern:*

Be it known that I, JOHN L. BENTON, of New Haven, in the county of New Haven and State of Connecticut, have invented a new and useful Improvement in Bicycle-Supporting Stands, of which the following is a specification.

My invention relates to an improvement in bicycle-supporting stands, one object being to provide a simple and effective stand which will support the bicycle with its wheels off the ground or floor and which will prevent the turning of the steering-wheel when the bicycle is so supported.

A further object is to provide a stand which will be very light and inexpensive and which may be folded into a small compass when not in use.

A practical embodiment of my invention is represented in the accompanying drawings, in which—

Figure 1:
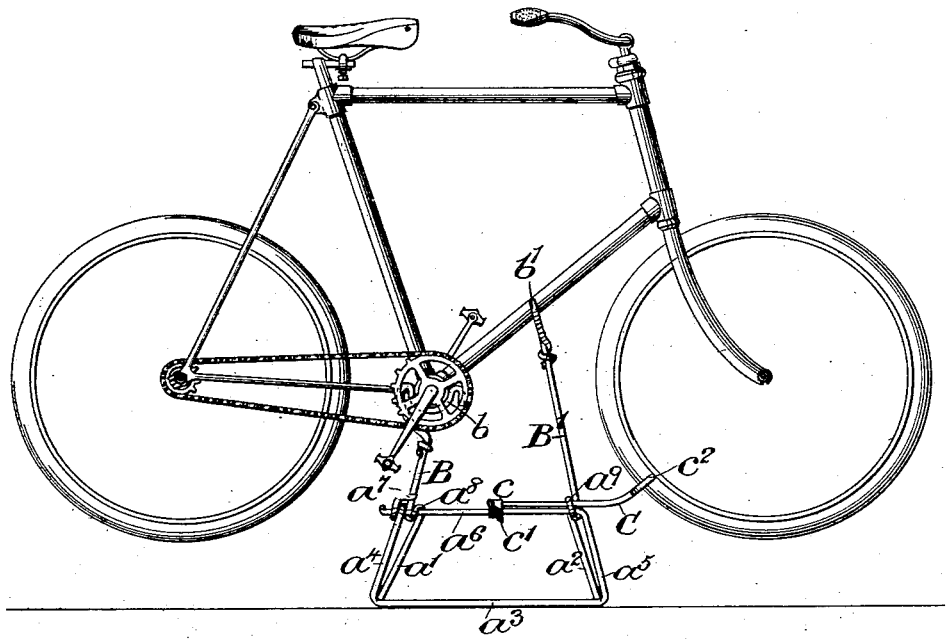
Figure 2:
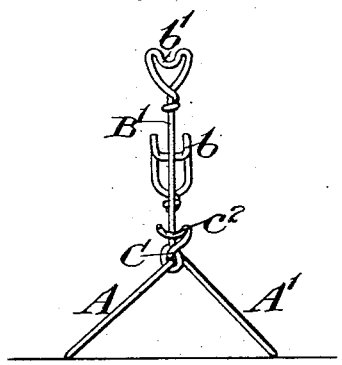
Figure 3:
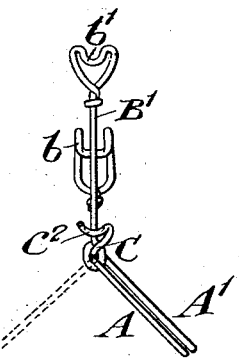
Figure 4:
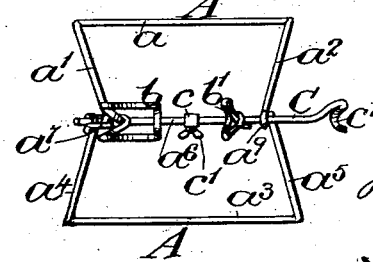

Figure 1 represents a side view of the supporting-stand, showing a bicycle supported thereon. Fig. 2 is a front view of the same, the bicycle not being shown. Fig. 3 is a similar view of the supporting-stand in its folded position, and Fig. 4 is a top plan view of the stand in its open position.

The stand comprises a base consisting of a swinging member A and a stationary member A', a rear upright B, a front upright B', and an adjustable arm C.

The several parts of the stand are preferably made of strong wire, so as to obtain a light and strong stand.

The rear upright B is provided with a suitable socket $b$ at its top for the reception of the crank-hanger of the bicycle. In the present instance the socket is formed by bending the wire end of the upright B in such a manner as to form a support for the crank-hanger near its opposite ends, so as to prevent the wheel from toppling over when placed in position therein. The socket $b$ preferably engages the crank-hanger very snugly, so as to still further hold it against any tendency to tip over laterally.

The forward upright B' is provided with a socket $b'$ in its upper end to partially embrace the front lower brace-tube of the bicycle at a point some distance forward of the crank-hanger.

The stationary base A' preferably consists of an elongated frame comprising a horizontal portion $a$ and two upright end portions $a'$ $a^2$. The stationary section A' of the base is bent at an angle to the uprights B B'.

The swinging section A of the base preferably consists of a lower horizontal portion $a^3$, two end upright portions $a^4$ $a^5$, and an upper horizontal portion $a^6$. The swinging section A of the base is provided with a suitable stop $a^7$, which is adapted to engage the rear upright B to limit the outward swinging movement of the said section. When the stop $a^7$ is engaged with the upright B, the two sections A A' are preferably at about an equal angle from the uprights B B' and form an elongated support. The uprights B B' and the stationary section A' of the stand are preferably formed of a single piece, and where the uprights B B' meet the upwardly-extended portions $a'$ $a^2$ of the base-section A' bearing-loops $a^8$ $a^9$ are formed, through which the upper horizontal portion $a^6$ of the swinging section A passes.

The front or steering wheel of the bicycle is held against turning by means of the adjustable arm C in the following manner: The said arm passes through the loop $a^9$, and at its rear end is provided with a socket-piece or sleeve $c$, which slides along the upper horizontal portion $a^6$ of the section A. The said socket-piece $c$ is provided with a suitable thumb-nut $c'$, which engages the said horizontal portion $a^6$ to lock the arm C in one of its sliding adjustments. The forward end of the said arm C is provided with a socket $c^2$, which is adapted to partially engage the tire and rim of the steering-wheel when the arm is slid forwardly.

The base may be made of the required length to form a substantial longitudinal support, and the sections may be adjusted at the proper angle to the uprights to form a substantial lateral support. Furthermore, the supporting-stand may be of any desired height to support the bicycle either with its wheels resting on the ground or spaced therefrom, as may be found most convenient.

It will be seen that the stand, as above described, consists of a very small number of parts, and when the arm C is slid backward as far as possible and the swinging section swung inwardly against the stationary section of the base the stand occupies a very small amount of room and is very convenient to handle.

It is evident that slight changes might be resorted to in the form and arrangement of the several parts without departing from the spirit and scope of my invention. Hence I do not wish to limit myself strictly to the structure herein set forth; but

What I claim is—

1. A bicycle-supporting stand comprising a suitable base consisting of a stationary section and a swinging section, a rear upright uprising from the stationary section and adapted to engage the crank-hanger and a front upright uprising from the stationary section and adapted to engage the front lower brace, substantially as set forth.

2. A bicycle-supporting stand, comprising a rear upright, a front upright, a base consisting of a stationary section and a swinging section comprising upper and lower horizontal portions connected by end upright portions, an adjustable arm adapted to slide along the upper horizontal portion of the swinging section and means for securing the arm to said upper horizontal portion, substantially as set forth.

3. A bicycle-supporting stand, comprising a rear upright adapted to engage the crank-hanger, a front upright adapted to engage the front lower brace and a base consisting of a section stationary with respect to the uprights and a swinging section, and a stop on the swinging section adapted to engage one of the uprights to limit the outward swinging movement of the said section, substantially as set forth.

JOHN L. BENTON.

Witnesses:
WILLARD D. WARREN,
E. F. FOOTE.